(12) United States Patent
Witt-Ehsani et al.

(10) Patent No.: US 10,236,017 B1
(45) Date of Patent: Mar. 19, 2019

(54) GOAL SEGMENTATION IN SPEECH DIALOGS

(71) Applicant: Amazon Technologies, Inc., Seattle, WA (US)

(72) Inventors: Silke Witt-Ehsani, Sunnyvale, CA (US); Giuseppe Pino Di Fabbrizio, Brookline, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/869,797

(22) Filed: Sep. 29, 2015

(51) Int. Cl.
| G10L 15/00 | (2013.01) |
| G10L 15/14 | (2006.01) |
| G10L 25/51 | (2013.01) |
| G10L 15/05 | (2013.01) |
| G10L 15/18 | (2013.01) |
| G10L 15/06 | (2013.01) |
| G10L 15/197 | (2013.01) |
| G10L 13/027 | (2013.01) |

(Continued)

(52) U.S. Cl.
CPC .......... *G10L 25/51* (2013.01); *G10L 13/027* (2013.01); *G10L 15/05* (2013.01); *G10L 15/063* (2013.01); *G10L 15/18* (2013.01); *G10L 15/197* (2013.01); *G10L 15/22* (2013.01); *G10L 2015/081* (2013.01); *G10L 2015/223* (2013.01)

(58) Field of Classification Search
CPC ..... G10L 15/22; G10L 15/18; G10L 15/1822; G10L 15/19; G10L 15/08; G10L 15/1815; G10L 15/04; G10L 15/14; G10L 2015/223; G10L 15/02; G10L 17/22; G06F 17/2785; G06F 17/30654; G06F 17/28; G06F 17/30657; G06F 17/30684; G06F 17/30864; G06F 17/30026; G06F 17/30976; G06F 17/30699; G06F 17/30867; G06F 3/048; H04L 51/046; H04L 12/1831; H04L 51/00; H04L 67/22; H04L 12/1822; H04L 51/16; H04L 12/1813; H04L 51/04; H04L 65/403; H04M 2201/40; H04M 3/568
See application file for complete search history.

(56) References Cited

U.S. PATENT DOCUMENTS 7,386,449 B2 * 6/2008 Sun .................. G10L 15/1822
  704/251
7,519,529 B1 * 4/2009 Horvitz .................. G06F 17/279
  369/30.04

(Continued)

*Primary Examiner* — Michael Ortiz-Sanchez
(74) *Attorney, Agent, or Firm* — Lee & Hayes, P.C.

(57) ABSTRACT

A speech-based system is configured to interact with a user through speech to determine intents and goals of the user. The system may analyze multiple dialog turns in order to determine and fully define a goal that the user is trying to express. Each dialog turn comprises a user utterance. Each dialog turn may also comprise a system speech response. In order to evaluate the performance of the system, logged data is analyzed to identify goal segments within the logged data, where a goal segment is a sequence of dialog turns that relate to a corresponding user goal. A subset of the dialog turns is annotated manually to delineate goal segments. A predictive model is then constructed based on the manually annotated goal segments. The predictive model is then used to identify goal segments formed by additional dialog turns.

20 Claims, 6 Drawing Sheets

(51) Int. Cl.
  *G10L 15/22*   (2006.01)
  *G10L 15/08*   (2006.01)

(56)  References Cited

U.S. PATENT DOCUMENTS

| | | | | |
|---|---|---|---|---|
| 7,580,842 | B1* | 8/2009 | Bangalore | G06F 17/27 |
| | | | | 704/257 |
| 8,340,971 | B1* | 12/2012 | Abella | H04M 3/493 |
| | | | | 704/1 |
| 8,577,671 | B1* | 11/2013 | Barve | G06F 17/30522 |
| | | | | 370/352 |
| 8,731,934 | B2* | 5/2014 | Olligschlaeger | H04M 3/2281 |
| | | | | 455/410 |
| 8,812,323 | B2* | 8/2014 | Tong | G06F 17/279 |
| | | | | 704/231 |
| 9,070,366 | B1* | 6/2015 | Mathias | G06F 17/279 |
| 9,318,109 | B2* | 4/2016 | Boies | G10L 15/1815 |
| 2007/0033005 | A1* | 2/2007 | Cristo | G06F 17/279 |
| | | | | 704/9 |
| 2007/0038436 | A1* | 2/2007 | Cristo | G06F 17/273 |
| | | | | 704/9 |
| 2008/0201143 | A1* | 8/2008 | Olligschlaeger | H04M 3/2281 |
| | | | | 704/235 |
| 2009/0306981 | A1* | 12/2009 | Cromack | G06F 17/30743 |
| | | | | 704/235 |
| 2011/0144999 | A1* | 6/2011 | Jang | G06K 9/00892 |
| | | | | 704/270.1 |
| 2013/0282380 | A1* | 10/2013 | Mauro | G06Q 20/305 |
| | | | | 704/275 |
| 2013/0339021 | A1* | 12/2013 | Deshmukh | G10L 15/18 |
| | | | | 704/257 |
| 2015/0012829 | A1* | 1/2015 | Brown | G06F 3/167 |
| | | | | 715/728 |
| 2015/0066479 | A1* | 3/2015 | Pasupalak | G06F 17/27 |
| | | | | 704/9 |
| 2015/0095033 | A1* | 4/2015 | Boies | G10L 15/1815 |
| | | | | 704/257 |
| 2015/0142704 | A1* | 5/2015 | London | G06N 5/04 |
| | | | | 706/11 |
| 2015/0332168 | A1* | 11/2015 | Bhagwat | G06F 3/0481 |
| | | | | 706/12 |
| 2016/0019893 | A1* | 1/2016 | Funase | G10L 15/22 |
| | | | | 704/235 |
| 2016/0050165 | A1* | 2/2016 | Thomas | G06F 3/04855 |
| | | | | 715/752 |
| 2016/0098393 | A1* | 4/2016 | Hebert | G06F 17/28 |
| | | | | 704/9 |
| 2016/0163311 | A1* | 6/2016 | Crook | G10L 15/183 |
| | | | | 704/275 |

* cited by examiner

GOAL SEGMENTATION IN SPEECH DIALOGS

BACKGROUND

Spoken dialog systems have evolved to handle a broad range of queries covering a growing number of topics. Rather than being confined to the duration of a phone call, such as used to be the case with telephony-based systems, newer generations of virtual agents are continuously online and can be summoned by simply speaking a wake-word. Speech-based assistants can be implemented by various types of devices, including smartphones; media players; home automation systems; electronic peripherals; various types of machinery and equipment; computers such as tablet, laptop, and desktop computers; and so forth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

A goal-oriented speech dialog system (SDS) interacts with a user through speech dialogs in order to determine goals of the user and corresponding activities to perform in response to the goals. Within an ongoing dialog, a user may attempt to express one or more goals. A goal may be to play a particular song, to add an item to a list, to look up an address, to get a weather forecast, and so forth. More than one dialog turn may sometimes be needed in order for the SDS to understand or fully define the goal of the user. Once the goal is understood, the SDS initiates an activity or function in fulfillment of the goal.

In evaluating the historical performance of an SDS it is useful to define goal segments, where each goal segment comprises a sequence of one or more turns of a speech dialog that relate to a single user goal. After identifying goal segments, the goal segments can be further analyzed to determine whether the SDS correctly understood and acted upon the goals that the user was expressing.

Goal segment identification within archived dialogs may be performed in an automated manner by analyzing dialog turns using a predictive model that has been previously created from training data in a machine learning process. The training data comprises various features that are available from data that has been logged by the SDS, to which additional goal boundary identifications have been added by a human analyst. After creating the predictive model based on the training data, recorded speech dialogs can be analyzed in an automated fashion to delineate goal segments. Goal segments identified in this manner can be used for further performance evaluations, such as by determining whether the SDS correctly identified goals and whether the SDS responded correctly to the goals.

Figure 1:
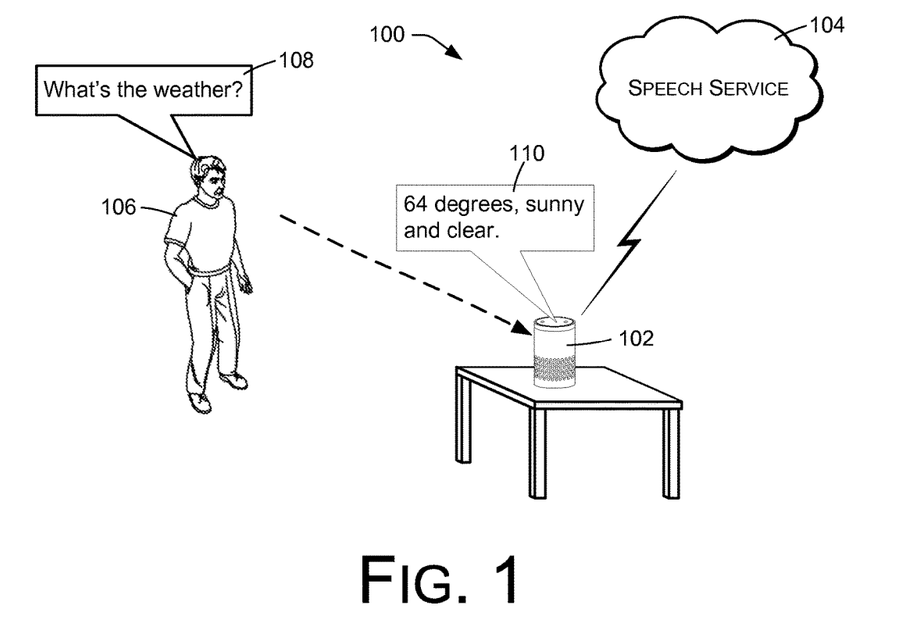
FIG. 1 shows an illustrative speech-based system that receives and acts in response to user utterances.

FIG. 1 shows an example of a goal-oriented speech dialog system 100 that interacts with a user through speech. In this example, the system 100 comprises a speech-based user interface 102 and a centralized speech service 104. The speech-based user interface 102 may be located in the home or other premises of a user 106. The speech service 104 in this embodiment is implemented as a network-based or cloud-based service, which may be configured to support and provide services for multiple speech-based user interfaces 102, in the premises of many different users.

In the example of FIG. 1, the user 106 is asking the question "What's the weather?" as represented by the dialog bubble 108. Note that in some embodiments, the user 106 may preface requests with a predefined keyword, referred to as a wake-word, which alerts the system 100 that subsequent speech is directed to the system 100.

In response to the spoken question, the system 100 responds with generated speech as indicated by the dialog bubble 110. The speech response may be generated by the speech service 104 and played by the speech-based user interface 102. In this example, the response indicates that the weather is "64 degrees, sunny and clear." Alternatively, the system 100 may respond with a question in order to clarify the intent of the user 106, and the user 106 may reply by speech. For example, the system 100 may ask "For what city would you like to hear the weather forecast," and the user may reply "Seattle." This process may be repeated until the system 100 determines the goal that the user is trying to express. The sequence of adjacent dialog turns that express the goal of the user is referred to as a goal segment.

In this embodiment, the speech service 104 receives real-time audio from the speech-based user interface 102 and analyzes the audio in order to detect user utterances, to determine user goals expressed by the utterances, and/or to perform actions or provide services in fulfillment of the user goals. The speech service 104 also generates and provides speech and other audio for playback by the speech-based user interface 102.

Figure 2:
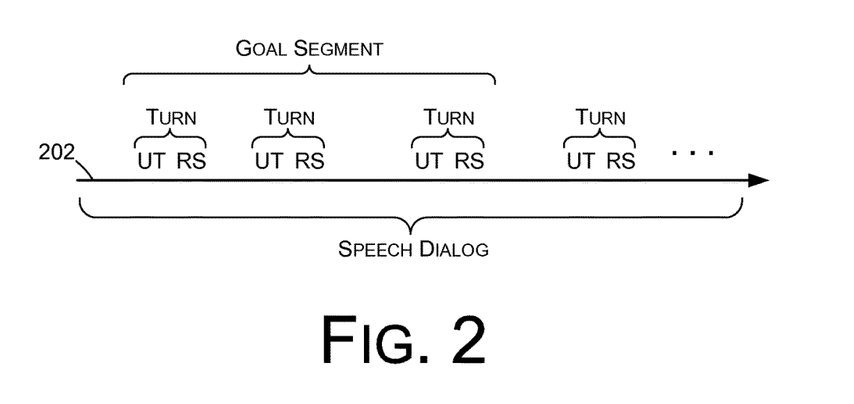
FIG. 2 is a diagram illustrating the composition of a speech dialog.

FIG. 2 illustrates example elements of a speech dialog in relation to a timeline 202. The speech dialog comprises or encompasses multiple dialog turns (TURNs) that occur over time. A dialog turn comprises a user utterance (UT) and any subsequent system speech response (RS) to the user utterance.

Each user utterance is considered to be the start of a new dialog turn, and each dialog turn begins with a user utterance. A dialog turn may include a system speech response but does not always include a system speech response. As an example, a dialog turn may comprise the user speech "turn the lights off" In response, the system 100 may simply turn off the lights and may not generate a system speech response. In this case, the user utterance alone is considered to be a dialog turn.

A dialog turn may include a system speech response that provides requested information, as in the example shown in FIG. 1. A dialog turn may alternatively include a system speech response that solicits further information from the user. For example, a user might state "play music" and the system 100 might respond by asking "what kind of music would you like to play?" In this case, the user utterance and the system response form a dialog turn. As an example of a subsequent dialog turn, the user might state "country music," and the system might respond by playing country music, without generating a speech response. This would be another example of a speech dialog that comprises a user utterance but does not include a speech response from the system 100.

A speech dialog includes any dialog turns that are temporally grouped together. As an example, a speech dialog may be defined as a sequence of dialog turns that are separated from another such sequence by at least a predefined time duration such as 12 minutes.

A speech dialog may contain any number of goal segments. A goal segment comprises any group of sequential dialog turns that relate to a particular goal that the user is trying to specify. A goal segment may be defined by a beginning dialog turn and a concluding dialog turn, corresponding to a beginning user utterance and a concluding user utterance.

Figure 3:
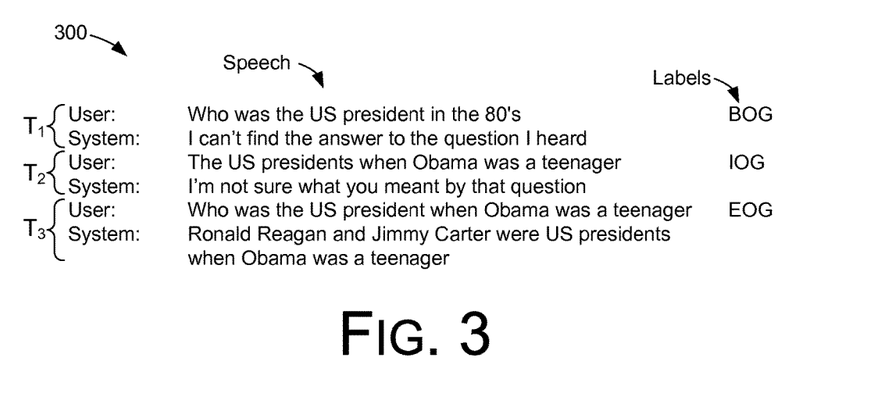
FIG. 3 a chart illustrating an example composition of a dialog goal segment.

FIG. 3 shows an example of speech corresponding to a goal segment 300. The goal segment 300 comprises multiple dialog turns, labeled $T_1$, $T_2$, and $T_3$. Each dialog turn in this example comprises a user utterance and a system speech response. The beginning and end of the segment are referred to as segment boundaries.

FIG. 3 also shows how each dialog may be labeled to delineate the goal segment 300 from other goal segments. In this example, the first dialog turn $T_1$ of the goal segment has been given the label BOG, which means that the dialog turn $T_1$ is at the beginning or beginning boundary of a goal segment. The second dialog turn $T_2$ has been given the label IOG, which means that the second dialog turn $T_2$ is an inner dialog turn, inside of a goal segment. The third dialog turn $T_3$ has been given the label EOG, which means that the third dialog turn $T_3$ is the end or at the concluding boundary of a goal segment.

Within a speech dialog there may be multiple goal segments, each of which may be defined in the manner shown in FIG. 3 by labeling individual dialog turns and/or labeling individual user utterances or system responses. In some cases, fewer labels may be used. For example inner dialog turns may not be explicitly labeled in some embodiments and may instead be inferred from surrounding BOG and EOG labels. In other examples, goal segments may be delineated by a single identifier or label, such as by a beginning of goal segment (BOG) label or an end of goal segment (EOG) label, to define either the beginning or end of each goal segment.

Labelling in this manner may be performed by a human analyst to facilitate performance evaluations of the system 100. Furthermore, as will be described in more detail below, such labelling may be performed using an automated process, based on a predictive model constructed from training data.

Figure 4:
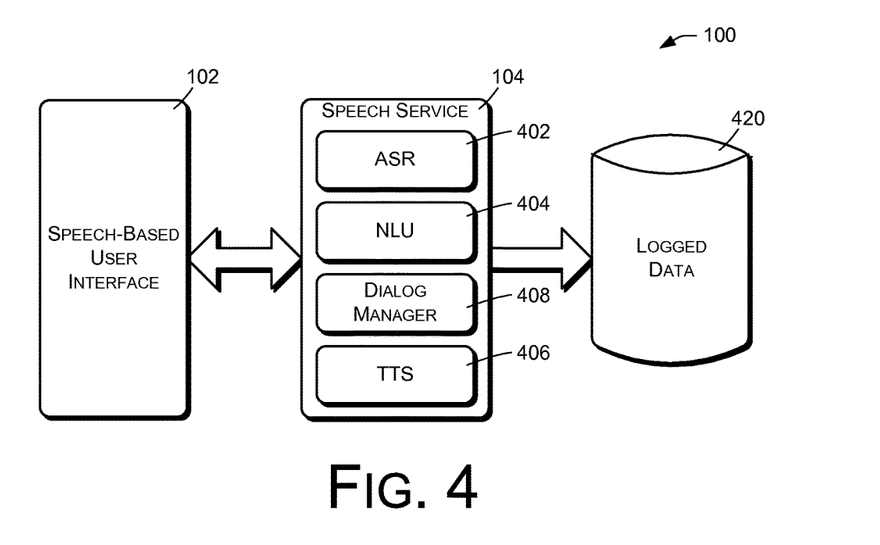
FIG. 4 is a block diagram illustrating high-level components of the speech-based system of FIG. 1.

FIG. 4 shows an example of relevant functional components of the system 100. The speech-based user interface 102 may comprise a computerized device such as a smartphone, personal computer, media player, personal assistant, or any other type of device that uses speech to interact with a user. The speech-based user interface 102 may have a microphone and a loudspeaker (not shown) to receive user speech input and to play system speech output. The speech service 104 may comprise a network-based service that communications with the speech-based user interface 102 to provide services in conjunction with the speech-based user interface 102. The speech service 104 may be implemented by one or more computers or computer servers that are programmed with software to implement the techniques described herein.

The speech-based user interface 102 and the speech service 104 may communicate over a wide-area network such as the Internet to exchange audio signals and other data. In certain embodiments, the speech-based user interface 102 streams audio to the speech service 104, and the speech service 104 analyzes the audio to determine user goals based on speech that is present in the audio. In some cases, the speech-based user interface 102 may begin streaming audio to the speech service 104 only after detecting the utterance of a wake-word.

The speech service 104 may also generate and provide audio to the speech-based user interface 102. For example, the speech service 104 may generate speech that is provided as an audio signal to the speech-based user interface 102.

The speech service 104 comprises an automated speech recognition (ASR) component 402 that receives and analyzes audio signals provided by the speech-based user interface 102 to produce a transcription of speech represented by the audio signals. The transcription comprises words that are recognized in the audio. The ASR component 402 may also produce various types of metadata regarding each user utterance. ASR metadata may include, for example, confidence levels corresponding to ASR hypotheses. Metadata may also include things such as the number of words in each ASR hypotheses.

The speech service 104 also comprises a natural language understanding (NLU) component 404 that predicts the meaning of each user utterance based on transcribed speech produced by the ASR component 402. The NLU component 404 analyzes the words of an utterance to identify a domain to which the utterance applies, to identify an intent expressed by the utterance, and to identify one or more slot values or named-value pairs relating to the intent. Slot values may define desired actions, objects of the actions, and so forth. The NLU component 404 may also produce various types of metadata regarding each user utterance. NLU metadata may include, for example, confidence levels corresponding to NLU hypotheses.

The speech service 104 may also include a text-to-speech (TTS) component 246 that that synthesizes or otherwise produces speech audio for output by the speech-based user interface 102.

The speech service 104 may also have a dialog manager (DM) 408. The dialog manager 408 is responsible for the turn-taking process that drives the user 106 toward the definition of a goal (e.g., play a song, buy a product, set a timer, etc.). The dialog manager 408 receives understood intents from the NLU component 404 and determines appropriate responses. In some cases, an appropriate response may comprise a spoken acknowledgement of or answer to a user request. In other cases, an appropriate response may comprise a spoken question eliciting further information from the user in order to further define the goal of the user. In yet other cases, an appropriate response might be to take an action other than responding by speech.

As it analyzes each user utterance and provides a response, the speech service 104 generates various data and metadata, including audio recordings, speech transcriptions, ASR and NLU hypotheses, confidence levels, and so forth. This data is archived or otherwise stored as logged data 420 for subsequent analysis. The logged data 420 may be organized by dialog turn, and may therefore include data corresponding to each dialog turn. The logged data 420 may include data for many thousands of speech dialogs, goal segments, and dialog turns, based on user interactions performed through many different speech-based user interfaces 102. The logged data 420 may include data representing a large time period, such as days, weeks, months, or years. In some cases, the logged data 420 may include data for substantially every interaction performed by the speech service 104 or for a substantial subset of such interactions.

Figure 5:
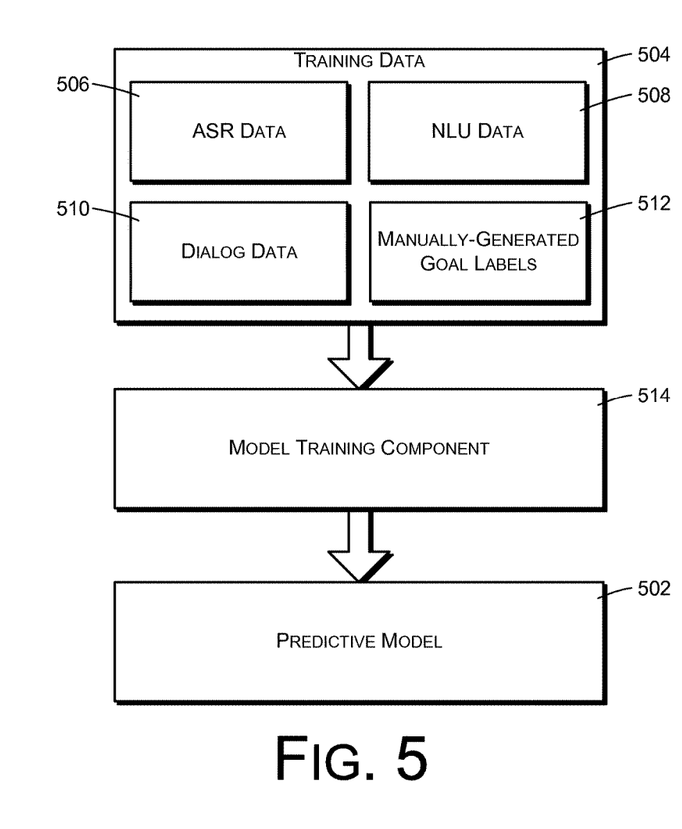
FIG. 5 is a block diagram illustrating functional aspects of creating a predictive model.

FIG. 5 shows an example of how a predictive model 502 may be created to classify dialog turns based on whether they are at boundaries of goal segments. The predictive model 502 is constructed based on training data 504 that includes dialog features obtained or derived from the logged data 420 as well as additional data created through a manual annotation process performed by human analysts. Generally, the training data 504 describes features and characteristics of each dialog turn, including features and characteristics of the user utterance within each dialog turn.

Part of the training data 504 may be obtained or derived from the logged data 420. For example, features that relate to ASR, NLU, and dialog management can be obtained or derived from the logged data 420. Thus, the training data 504 may include machine-generated data comprising ASR data 506, NLU data 508, and dialog data 510. The training data may include various metadata such as acoustic features of user utterances, ASR statistics and confidence levels, NLU hypotheses and confidence levels, dialog management information, and so forth.

In addition to machine-generated data regarding dialog turns, the training data 504 may also include manually-generated goal labels 512. The manually-generated goal labels 512 may be provided by human analysts based on analyses of the logged data 420. More specifically, the manually-generated goal labels 512 may be created by a human analyst who (a) listens to logged user speech and creates transcriptions of the user speech, (b) determines the semantic meanings of the transcribed user speech, and (c) evaluates a sequence of user utterances and system responses to indicate goal boundaries. Goal boundaries may be indicated by labelling the user utterances and/or corresponding dialog turns as shown in FIG. 3 to indicate which dialog turns of a speech dialog correspond to the start of a goal segment, which dialog turns are inside of a goal segment, and/or which dialog turns are outside of a goal segment. The analyst may also indicate whether the system successfully identified the user goal and correctly fulfilled the goal.

A training component 514 receives the training data 504. Based on the training data 504, the training component 514 produces the predictive model 502, which can be subsequently used in conjunction with logged data corresponding to other speech dialogs to produce goal labels for such other speech dialogs without further human analysis.

Figure 6:
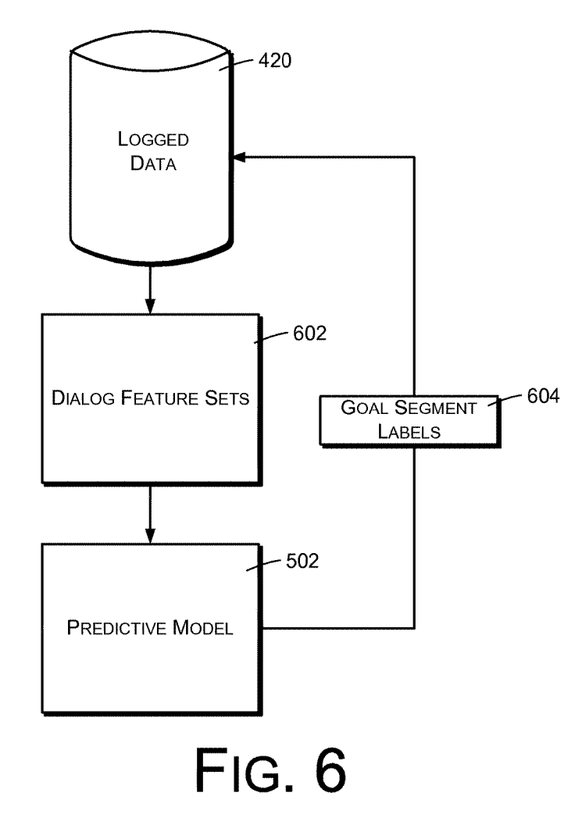
FIG. 6 is a block diagram illustrating functional aspects of labeling goal segments based on the predictive model.

FIG. 6 shows how the predictive model 502 may be used to analyze a speech dialog in order to determine the boundaries of goal segments in an automated and/or unsupervised manner. The predictive model 502 is responsive to a stream of dialog feature sets 602 that are based on or derived from the logged data 420. Each feature set 602 contains features that describe or relate to a particular dialog turn and/or to the user utterance of the dialog turn. Based on the feature sets 602, the predictive model determines, for each dialog turn, whether the dialog turn is the beginning turn of a goal segment, an inner turn of a goal segment, and/or the ending turn of a goal segment, and produces goal segment labels 604 that are saved back to the logged data 420, thereby supplementing the logged data with the goal segment labels 604.

The predictive model 502 may be used to evaluate characteristics of speech dialogs other than goal segments. For example, the predictive model may be used to analyze and record the success or failure of a speech dialog, where a successful dialog is one in which the intent of the user was correctly interpreted and acted upon and a failed dialog is one in which the intent of the user was not correctly interpreted or acted upon.

Note that the process of FIG. 6 does not include human analysis of the logged data. Rather, human analysis is used to provide goal segment labels for a subset of the available logged speech dialogs; the provided goal segment labels are used with other dialog features to create the predictive model 502; and the the predictive model 502 is then used to generate goal segment labels for logged speech dialogs in addition to those that were used for training. The result is the ability to automatically tag large numbers of speech dialogs with regard to goal segment boundaries, thereby providing information that is useful in further evaluations regarding system performance and accuracy.

The predictive model 502 may be constructed using various techniques. In described embodiments, a statistical modelling method referred to as linear chain conditional random fields (CRFs) is used to create the predictive model 502. In the described embodiments, a CRF consists of a single exponential model that models the joint probability of an entire sequence of labels given an observation sequence. Because of this, CRFs can represent multiple interaction features and long-range dependencies. In other words, CRF techniques can account for the probability that the value of a goal label can depend on past and future dialog turns, as well as the current dialog turn. Various other type of modeling techniques may alternatively be used, such as neural networks, Hidden Markov models, etc.

Figure 7:
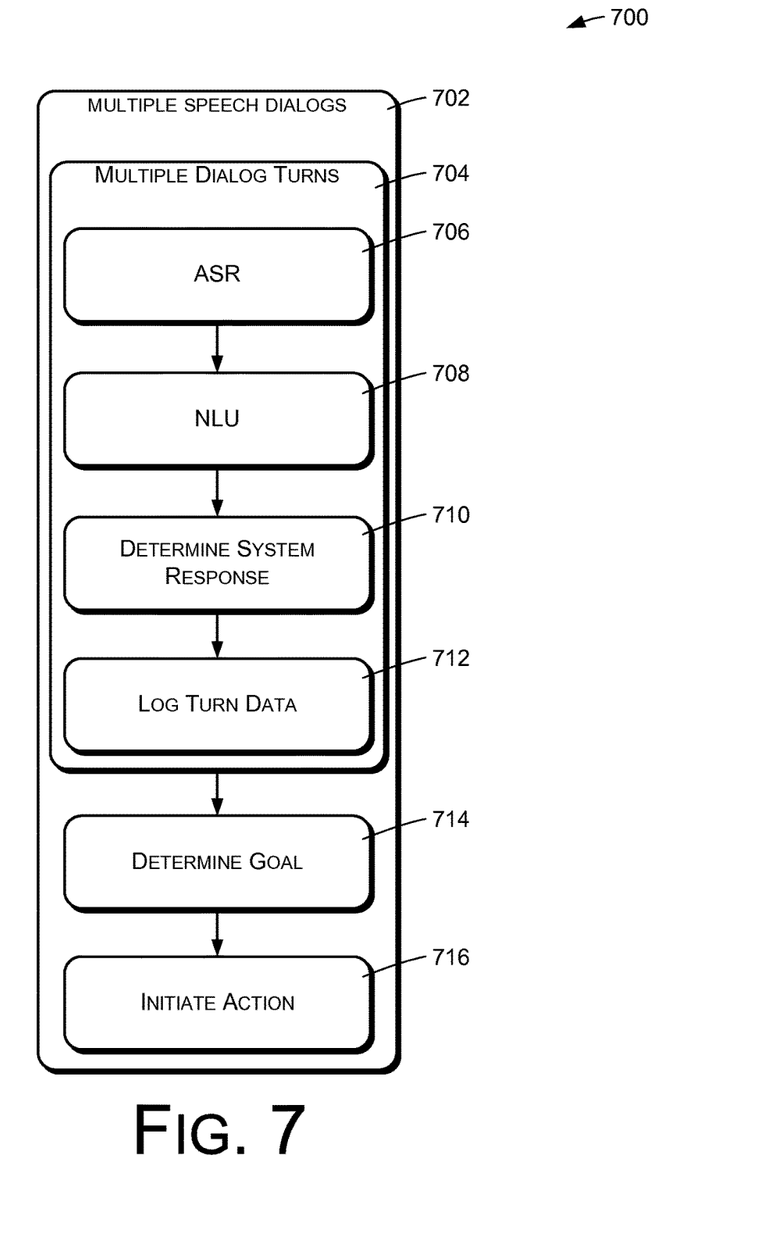
FIG. 7 is a flow diagram illustrating an example method of providing speech services.

FIG. 7 shows an example method 700 of interacting with a user through a goal-based speech dialog system. An action 702 comprises processing multiple speech dialogs, which may be with one user or multiple users. Processing a speech dialog comprises an action 704 of processing multiple dialog. Each dialog turn comprises a user utterance and may also include a speech response by the system 100. Processing a dialog turn comprises an action 706 of performing ASR on the user utterance of the dialog turn to produce an ASR hypothesis corresponding to the dialog turn. The ASR hypothesis may comprise a transcription of the speech represented by the user utterance.

Processing each dialog turn also comprises an action 708 of performing NLU to produce NLU hypotheses corresponding to the dialog turn. The NLU hypotheses may comprise data indicating a domain to which the user utterance applies, an intent represented by the user utterance, and one or more slot values.

The NLU and ASR activities may also produce metadata regarding the ASR and NLU hypotheses, such as statistics, confidence levels, acoustic features, time values, durations, and so forth.

Processing a dialog turn also comprises an action 710 of determining a system response to the user utterance. The response may comprise speech that is generated by the system. The dialog manager 408 may be responsible for generating the response.

An action 712 comprises logging turn-related data such as ASR and NLU hypotheses and related metadata. System responses and related data may also be logged.

The method 700 includes processing dialog turns until an action 714 can be performed of determining the goal of the user. Upon determining the user goal, an action 716 is performed of initiating an action in fulfillment of the user goal.

Figure 8:
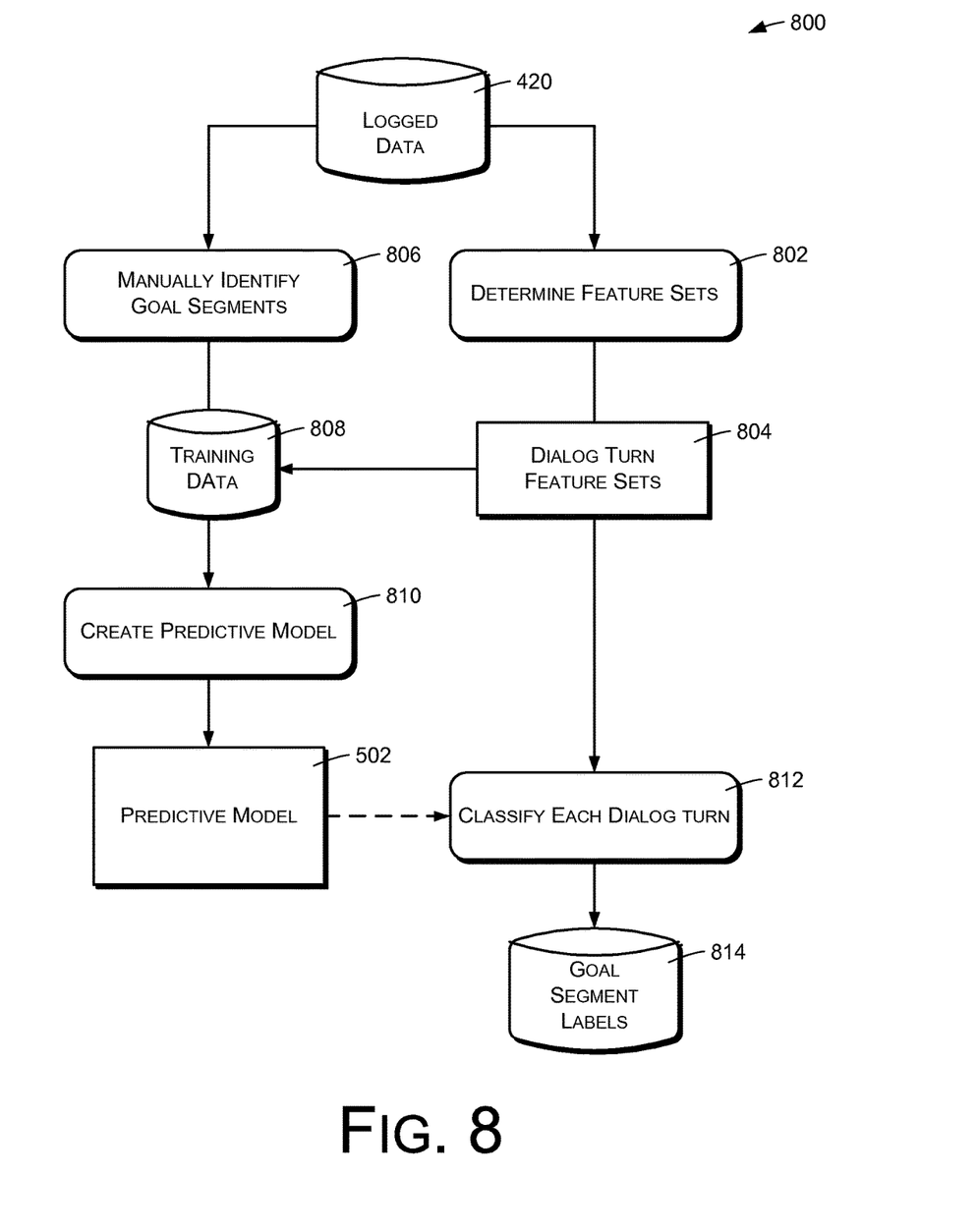
FIG. 8 is a flow diagram illustrating an example method of analyzing logged speech interface data.

FIG. 8 shows an example method 800 that uses machine learning techniques to identify goal segments within speech dialogs. A goal segment comprises a sequence of one or more dialog turns that relate to a corresponding user goal. Each dialog turn comprises a user utterance. Each dialog turn may also comprise a system speech response. A speech dialog may contain multiple goal segments, each relating to a different user goal.

The example method 800 is based on the logged data 420, which may comprise various types of data regarding operation of a speech-based system. In the described embodiments, the logged data 420 includes information regarding multiple speech dialogs and multiple dialog turns within each speech dialog. The logged data for an individual dialog turn may include any of the following, as examples:

an audio recording of a user utterance;
an ASR hypothesis, comprising a hypothesized transcription of the user utterance;
NLU hypotheses regarding domain, intent, and slot values of the user utterance;
confidence levels of ASR and NLU hypotheses;
timestamps relating to the dialog turn, such as timestamps indicating the time that the dialog turn occurred and/or that elements of the dialog turn occurred;
user actions, such as whether the user spoke a wake-word to begin the dialog turn;
the system speech response to the user utterance;
any action taken by the system in an attempt to fulfill a recognized user goal.

An action 802 comprises determining feature sets 804 corresponding respectively to individual dialog turns. The features of each feature set are obtained or derived from the logged data 420. The feature set of a particular dialog turn may include features of that dialog turn, features of preceding and following dialog turns, and/or relationships between the particular dialog turn and other dialog turns. Features may include data produced by ASR, NLU, and dialog management functionality of the system. Features corresponding to a particular dialog turn may include, as examples:

a time relationship between the particular dialog turn and another of the dialog turns;
one or more time relationships between pairs of dialog turns that include the particular dialog turn;
a time between the particular dialog turn and a preceding dialog turn;
a time between the particular dialog turn and a succeeding dialog turn;
ASR data, including metadata, corresponding to the particular dialog turn and/or to another of the dialog turns such as a preceding or following dialog turn;
a confidence level of the ASR hypothesis corresponding to the particular dialog turn and/or to another of the dialog turns such as a preceding or following dialog turn;
NLU data, including metadata, corresponding to the particular dialog turn and/or to another of the dialog turns such as a preceding or following dialog turn;
a confidence level of an NLU hypothesis corresponding to the particular dialog turn and/or to another of the dialog turns such as a preceding or following dialog turn;
one or more NLU hypotheses corresponding to the particular dialog turn and to one or more NLU hypotheses corresponding to another of the dialog turns such as a preceding or following dialog turn;
a system response such as a speech response that is part of the particular dialog turn;
a system response such as a speech response that is part of another of the dialog turns such as a preceding or following dialog turn;
a system action;
an indication of whether a wake-word was prefaced the particular dialog turn;
presence of an offensive word in user speech;
type of system prompt given as part of a system response;
presence of a prompt within an error message given as part of a system response;
a translation error rate indicating the number of overlapping words between turns;
a number of words per utterance;
NLU slots and values; an (e.g., song name, artist name, album name, etc.)
target NLU slots of a particular dialog act or response.

An action 806 is performed of manually annotating dialog turns of multiple speech dialogs to identify and delineate goal segments within the speech dialogs. The action 806 is performed on a subset or limited sample of the speech dialogs represented by the logged data 420.

The action 806 may involve several tasks performed by human analysts, such as transcribing user utterances, analyzing the utterances to determine their semantic meanings, and labelling the utterances and/or dialog turns to indicate any dialog turns that are at boundaries of goal segments, such as being the first dialog turn of a goal segment or the last dialog turn of a goal segment. The analysts may label the dialog turns as shown in FIG. 3, as one example. Other forms of goal segment annotation may also be used.

The goal boundary annotations and the feature sets corresponding to the manually-evaluated subset of speech dialogs are combined to create training data 808. The training data 808 corresponding to a given dialog turn comprises the feature set corresponding to the given dialog turn and one or more goal boundary identifiers that delineate goal segments within the subset of speech dialogs that have been manually evaluated.

An action 810 comprises receiving the training data 808 and analyzing dependencies between the goal boundary identifiers and the feature sets of the training data to construct the predictive model 502 from the training data 808. The predictive model may be a CRF-based model as described above, configured to calculate the probability that any given dialog turn is a boundary turn, based on a feature set 804 corresponding to the dialog turn. The predictive model 502 may calculate the probability that a particular dialog turn is a beginning turn of a goal segment, an inner turn of a goal segment, or an outer turn of a goal segment.

An action 812 comprises applying the predictive model 502 to a larger subset of the dialog turns represented by the logged data 420 to classify each of the dialog turns as either a beginning turn of a goal segment, an inner turn of a goal segment, or an ending turn of a goal segment. For example, the action 812 may comprise using the predictive model 502 to determine that a particular dialog turn is at a boundary (the beginning or end) of a goal segment.

The action 812 produces goal segment identifiers or labels 814, which may be added back to the logged data 420 for future analysis. Specifically, the action 812 may comprise associating a start label with a dialog turn that forms the beginning of a goal segment and associating an end label with a dialog turn that forms the end of a goal segment.

Note that the training data 808 is created for a first, relatively small subset of the dialog turns represented by the logged data 420. The classification 812 is performed with respect to a second subset of the dialog turns represented by the logged data. The second subset may be relatively larger than the first subset, and may or may not be exclusive of the first subset.

Figure 9:
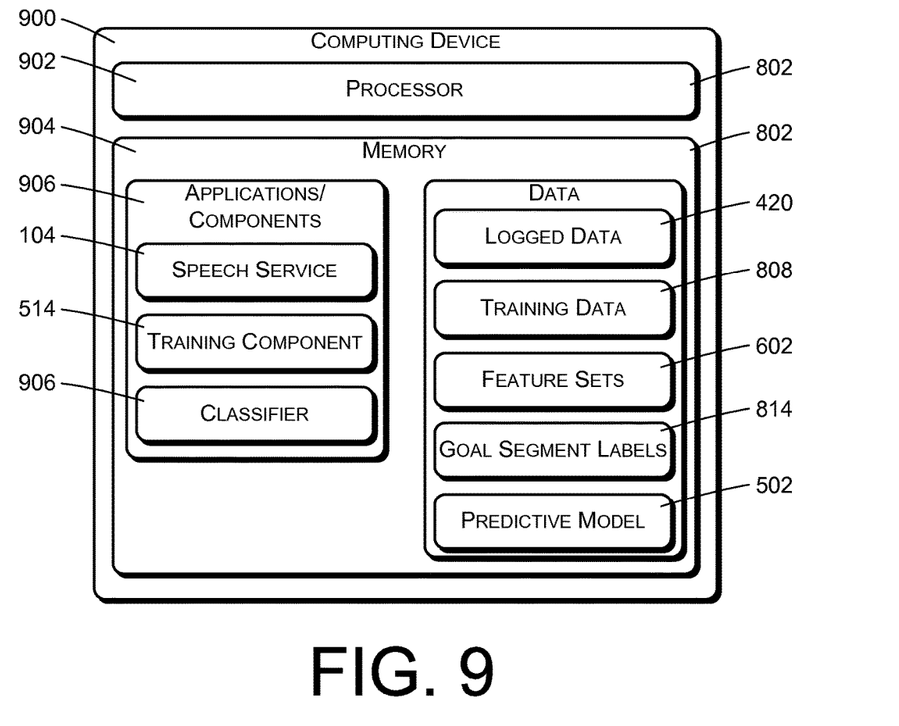
FIG. 9 is a block diagram showing relevant functional components of a computing device that may be used to implement the techniques described herein.

FIG. 9 shows relevant components of a computing device 900, one or more of which may be configured to implement the techniques described herein. The computing device 900 may comprise a computer or computer server, which acts either alone or in concert with other such computers or computer servers to analyze the logged data 420, to determine feature sets 804, to create the training data 808, to create the predictive model 502, and to classify the dialog turns of speech dialogs. One or more computing devices such as this may also be used to implement the speech service 104 and/or to implement the speech-based user interface 102. The computing device 900 may have various hardware and software components, not shown, that are particular to the application of the computing device 900.

For purposes of illustration, a single computing device 900 is shown as implementing both the speech service 104 and the described training/analysis functionality. In actual embodiments, different computing devices may be used for the different activities described herein.

The computing device 900 has a processor 902 and memory 904. The processor 902 may include multiple processors, or a processor having multiple cores. The processor 902 may comprise or include various different types of processors, including digital signal processors, graphics processors, etc. The memory 904 may be a type of non-transitory computer-readable storage media and may include volatile and nonvolatile memory. Thus, the memory 904 may include, but is not limited to, RAM, ROM, EEPROM, flash memory, magnetic media, optical media, and other memory types. The memory 904 may also include types of memory that are commonly used to transfer or distribute programs or applications, such as CD-ROMs, DVDs, thumb drives, portable disk drives, and so forth.

The memory 904 may be used for temporary and/or permanent storage of data structures such as the logged data 420, the dialog feature sets 602, the training data 808, the goal segment labels 814, predictive model 502, and so forth. The memory 904 may also be used to store applications and programs that implement the functionality described above, such as the speech service 104, the model training component 514, and a classifier 906 that performs the classification action 812 based on the feature sets 602. The applications and programs may be in the form of computer-executable instructions that are executed by the processor 902 to perform acts or actions that implement the methods and functionality described herein.

In some implementations, the speech service 104 may be implemented by a network-accessible computing platform that is maintained and accessible via a network. Network-accessible computing platforms such as this may be referred to using terms such as "on-demand computing", "software as a service (SaaS)", "platform computing", "network-accessible platform", "cloud services", "data centers", and so forth. The speech service 104 may be configured to provide services to large numbers of speech-based user interfaces 102 in the homes or premises of different users.

Communications between the speech-based user interface 102 and the speech service 104 may be implemented through various types of data communications networks, including local-area networks, wide-area networks, and/or the public Internet. Cellular and/or other wireless data communications technologies may also be used for communications.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
processing a first dialog turn comprising a user utterance, wherein processing the first dialog turn comprises:
performing automated speech recognition (ASR) on the user utterance to produce an ASR hypothesis corresponding to the first dialog turn; and
performing natural language understanding (NLU) on the ASR hypothesis to produce an NLU hypothesis corresponding to the first dialog turn;
determining a first feature set corresponding to the first dialog turn, wherein the first feature set corresponding to the first dialog turn indicates:
a time relationship between the first dialog turn and a second dialog turn;
a confidence level of the ASR hypothesis corresponding to the first dialog turn; and
a confidence level of the NLU hypothesis corresponding to the first dialog turn;
determining a second feature set corresponding to the second dialog turn; and
receiving a first goal boundary identifier, wherein the first goal boundary identifier delineates a first goal segment comprising a sequence of one or more dialog turns that relate to a corresponding goal of the user utterance;
analyzing one or more dependencies between the goal boundary identifier and the first feature set;
generating a predictive model based at least in part on the analyzing, wherein the predictive model is responsive to a third feature set corresponding to a third dialog turn to delineate a second goal segment;
determining, based at least in part on the predictive model and the third feature set, the second goal segment;
associating, with the second goal segment, a start label that indicates a beginning of the second goal segment; and
associating, with the second goal segment, an end label that indicates an end of the second goal segment.

2. The method of claim 1, wherein determining the first feature set comprises analyzing logged data associated with multiple dialog turns.

3. The method of claim 1, wherein the first feature set corresponding to the first dialog turn comprises a feature from a fourth dialog turn that precedes the first dialog turn and a fifth dialog turn that follows the first dialog turn.

4. A system comprising:
one or more processors; and
one or more non-transitory computer-readable media storing computer-executable instructions that, when executed on the one or more processors, cause the one or more processors to perform actions comprising:

determining a first feature set corresponding to a first dialog turn that is stored in a set of logged data, the first dialog turn corresponding to a first user utterance;

receiving a first goal boundary identifier indicating that the first dialog turn represents a boundary of a first goal segment, the first goal segment comprising a first sequence of one or more dialog turns that relate to a first user goal;

generating a predictive model based at least in part on the first feature set and the first goal boundary identifier;

determining a second feature set of a second dialog turn corresponding to a second user utterance;

analyzing the second feature set using the predictive model;

determining, based at least in part on the analyzing, that the second dialog turn represents a boundary of a second goal segment, the second goal segment comprising a second sequence of one or more dialog turns that relate to a second user goal; and storing a second goal boundary identifier indicating that the second dialog turn represents the boundary of the second goal segment.

5. The system of claim 4, wherein determining the first feature set comprises determining the first feature set based at least in part on at least one of a third dialog turn that precedes the first dialog turn or a fourth dialog turn that follows the first dialog turn.

6. The system of claim 4, wherein the first feature set comprises a confidence level of an automated speech recognition (ASR) hypothesis corresponding to the first dialog turn.

7. The system of claim 4, wherein the first feature set comprises automated speech recognition (ASR) metadata corresponding to the first dialog turn and ASR metadata corresponding to a third dialog turn.

8. The system of claim 4, wherein the first feature set comprises natural language understanding (NLU) metadata corresponding to the first dialog turn and NLU metadata corresponding to a third dialog turn.

9. The system of claim 4, wherein the first feature set comprises one or more natural language understanding (NLU) hypotheses corresponding to the first dialog turn and one or more NLU hypotheses corresponding to a third dialog turn.

10. The system of claim 4, wherein the first feature set comprises text corresponding to a first system response that is part of the first dialog turn and text corresponding to a second system response that is part of a third dialog turn.

11. The system of claim 4, wherein the first feature set indicates whether a wake-word prefaced the first dialog turn.

12. The system of claim 4, wherein the first feature set indicates an amount of time between the first dialog turn and a third dialog turn.

13. A method comprising:
building a predictive model based at least in part on training data comprising at least (a) a first feature set corresponding to a first dialog turn and (b) a first goal boundary identifier indicating that the first dialog turn represents a boundary of a first goal segment, the first goal segment comprising a first sequence of one or more dialog turns that relate to a first user goal;

receiving a second feature set corresponding to a second dialog turn;

analyzing the second feature set using the predictive model; and determining, based at least in part on the analyzing, that the second dialog turn represents a boundary of a second goal segment comprising a sequence of one or more dialog turns that relate to a corresponding second user goal.

14. The method of claim 13, wherein determining that the second dialog turn represents a boundary of the second goal segment comprises determining that the second dialog turn represents the second goal segment based at least in part on a third feature set of at least one of a third dialog turn that precedes the second dialog turn or a fourth dialog turn that follows the second dialog turn.

15. The method of claim 13, wherein the first feature set comprises one or more features of a third dialog turn that precedes the first dialog turn and one or more features of a fourth dialog turn that follows the first dialog turn.

16. The method of claim 13, wherein the first goal boundary identifier comprises a human annotations.

17. The method of claim 13, wherein the predictive model comprises a conditional random fields model.

18. The method of claim 13, wherein the first feature set includes data produced by automatic speech recognition (ASR).

19. The method of claim 13, wherein the first feature set includes data produced by natural language understanding (NLU).

20. A system comprising:
one or more processors; and
one or more non-transitory computer-readable media storing computer-executable instructions that, when executed on the one or more processors, cause the one or more processors to perform actions comprising:
generating a predictive model using a first feature set of a first dialog turn and an indication that the first dialog turn represents a first boundary of a first goal segment;

determining a second feature set of a second dialog turn corresponding to a user utterance;

analyzing the second feature set using the predictive model;

determining, based at least in part on the analyzing, that the second dialog turn represents a second boundary of a second goal segment, the second goal segment comprising a sequence of one or more dialog turns that relate to a user goal; and storing an indication that the second dialog turn represents the second boundary of the second goal segment.

* * * * *